(12) United States Patent
Bar-Joshua et al.

(10) Patent No.: US 10,630,537 B2
(45) Date of Patent: *Apr. 21, 2020

(54) PREDICTIVE ANALYTICS AND DEVICE TRACKING TO FACILITATE MINIMIZATION OF ALERT EVENTS

(71) Applicant: International Business Machines Corporation, Armonk, NY (US)

(72) Inventors: Michael Bar-Joshua, Haifa (IL); Itzhack Goldberg, Hadera (IL); Roxana Monge Núñez, San José (CR); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,427

(22) Filed: Dec. 13, 2017

(65) Prior Publication Data
US 2018/0248748 A1 Aug. 30, 2018

Related U.S. Application Data

(63) Continuation of application No. 15/445,009, filed on Feb. 28, 2017.

(51) Int. Cl.
*G06F 15/173* (2006.01)
*H04L 12/24* (2006.01)

(52) U.S. Cl.
CPC ...... *H04L 41/0686* (2013.01); *H04L 41/0681* (2013.01); *H04L 41/12* (2013.01); *H04L 41/147* (2013.01)

(58) Field of Classification Search
None
See application file for complete search history.

(56) References Cited

U.S. PATENT DOCUMENTS 6,812,844 B1   11/2004   Burgess
6,924,742 B2   8/2005   Mesina
(Continued)

FOREIGN PATENT DOCUMENTS

CA   2720892   5/2012
CA   2816910   5/2012
(Continued)

OTHER PUBLICATIONS

Tan, C., et al., "Social Action Tracking via Noise Tolerant Time-varying Factor Graphs," KDD'10, Jul. 25-28, 2010, pp. 1049-1058.
(Continued)

*Primary Examiner* — Brian Whipple
*Assistant Examiner* — Gregory P Tolchinsky
(74) *Attorney, Agent, or Firm* — Amin, Turocy & Watson, LLP

(57) ABSTRACT

Techniques for autonomously tracking and/or predicting an alert event are provided. In one example, a system can comprise a memory that stores computer executable components. The system can also comprise a processor, operably coupled to the memory, and that executes the computer executable components stored in the memory. The computer executable components can comprise a schedule component that determines plan information for a hub of a plurality of hubs, and the hub can be coupled to a device. The computer executable components can further comprise a tracking component that identifies a deviation from the plan information by the hub. Additionally, the computer executable components can comprise a prediction component that determines a probability that the deviation will result in an alert event.

17 Claims, 10 Drawing Sheets

(56) References Cited

U.S. PATENT DOCUMENTS

| | | |
|---|---|---|
| 9,189,943 B1 | 11/2015 | Rambadt et al. |
| 9,286,783 B1 | 3/2016 | Teller et al. |
| 9,324,149 B2 | 4/2016 | Wigton et al. |
| 2005/0091524 A1* | 4/2005 | Abe ............... G06F 21/6245 726/26 |
| 2006/0069470 A1* | 3/2006 | Campbell ........ G05B 19/41895 701/23 |
| 2007/0222622 A1 | 9/2007 | Sweeney |
| 2009/0089078 A1* | 4/2009 | Bursey ................ H04W 4/70 705/300 |
| 2010/0009626 A1 | 1/2010 | Farley |
| 2010/0164715 A1 | 7/2010 | Buller et al. |
| 2011/0111724 A1 | 5/2011 | Baptiste |
| 2013/0033387 A1* | 2/2013 | Trope ................. G01C 23/00 340/971 |
| 2013/0185369 A1* | 7/2013 | Bain .................. H04L 51/24 709/206 |
| 2014/0015683 A1 | 1/2014 | Subramanya et al. |
| 2014/0062790 A1* | 3/2014 | Letz .................. H04W 4/21 342/386 |
| 2014/0370479 A1 | 12/2014 | Gazzaley |
| 2015/0154847 A1 | 6/2015 | Oliver et al. |
| 2015/0269824 A1* | 9/2015 | Zhang ............... G08B 21/0438 340/539.12 |
| 2016/0100341 A1* | 4/2016 | Wu .................. H04W 36/0083 455/436 |
| 2016/0157150 A1* | 6/2016 | Wirtanen ............ H04W 48/16 455/434 |
| 2016/0373252 A1* | 12/2016 | Goldstein ............. H04L 9/06 |
| 2018/0069899 A1* | 3/2018 | Lang ................ H04L 63/20 |
| 2018/0189669 A1* | 7/2018 | Jeon ................ G06Q 10/047 |
| 2018/0316690 A1* | 11/2018 | Cho ................. H04W 4/06 |
| 2018/0343598 A1* | 11/2018 | Xu .................. H04W 36/08 |

FOREIGN PATENT DOCUMENTS

| | | |
|---|---|---|
| CN | 203689654 | 7/2014 |
| CN | 203759830 | 8/2014 |
| CN | 203773687 | 8/2014 |
| CN | 104732711 | 6/2015 |
| CN | 204915201 | 12/2015 |
| EP | 0028818 | 5/1981 |
| EP | 2638534 | 9/2013 |
| WO | 2012064999 | 5/2012 |
| WO | 2013035087 | 3/2013 |

OTHER PUBLICATIONS

"A gentle introduction to blockchain technology," Bits on blocks, Sep. 9, 2015, 27 pages, https://bitsonblocks.net/2015/09/09/a-gentle-introduction-to-blockchain-technology/.

Mell et al., "The NIST Definition of Cloud Computing," NIST Special Publication 800-145, Sep. 2011, National Institute of Standards and Technology, U.S. Department of Commerce, 7 pages.

Office Action for U.S. Appl. No. 15/445,009 dated Jan. 28, 2019, 36 pages.

Final Office Action received for U.S. Appl. No. 15/445,009 dated Aug. 8, 2019, 31 pages.

* cited by examiner

PREDICTIVE ANALYTICS AND DEVICE TRACKING TO FACILITATE MINIMIZATION OF ALERT EVENTS

BACKGROUND

The subject disclosure relates to predictive analytics and device tracking, and more specifically, to predictive analytics and device tracking to facilitate minimization of alert events.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate tracking and/or predicting an alert event are described.

According to an embodiment, a system is provided. The system can comprise a memory that stores computer executable components. The system can also comprise a processor, operably coupled to the memory, and that executes the computer executable components stored in the memory. The computer executable components can comprise a schedule component that can determine plan information for a hub of a plurality of hubs, wherein the hub is communicatively coupled to a device. The computer executable components can also comprise a tracking component that can identify a deviation from the plan information by the hub. Also, the computer executable components can also comprise a prediction component that can determine a probability that the deviation will result in an alert event.

According to another embodiment, a computer-implemented method is provided. The computer-implemented method can comprise determining, by a system operatively coupled to a processor, schedule information for a hub of a plurality of hubs, wherein the hub is communicatively coupled to a device. The computer-implemented method can further comprise identifying, by the system, a deviation from the schedule information by the hub. Also, the computer-implemented method can further comprise determining, by the system, a probability that the deviation will result in an alert event.

According to another embodiment, a computer program product is provided. The computer program product can comprise a computer readable storage medium having program instructions embodied therewith. The program instructions can be executable by a processor to cause the processor to determine schedule information for a hub. The hub can be of a plurality of hubs, and can be communicatively coupled to a plurality of devices. The program instructions can cause the processor to identify a deviation from the schedule information by the hub. Also, the program instructions can cause the processor to determine a probability that the deviation will result in an alert event.

DETAILED DESCRIPTION

Figure 1:
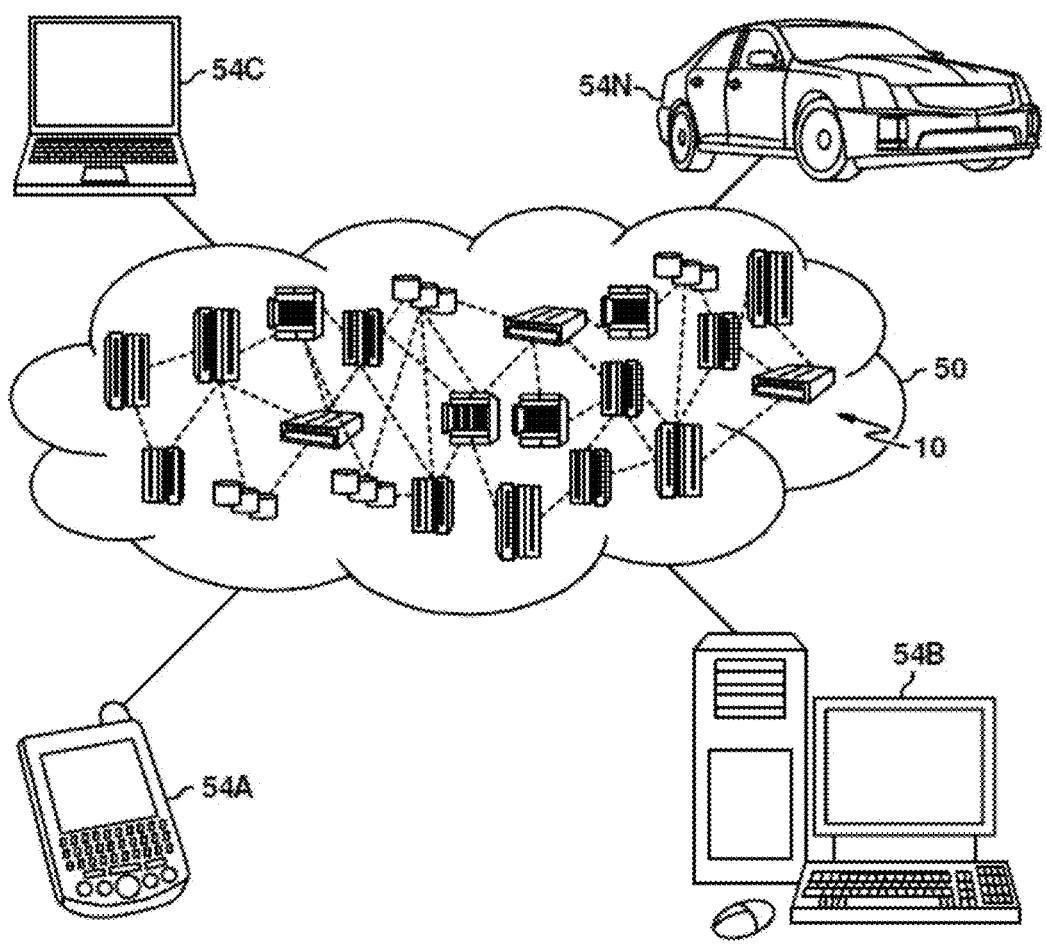
FIG. 1 depicts a cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
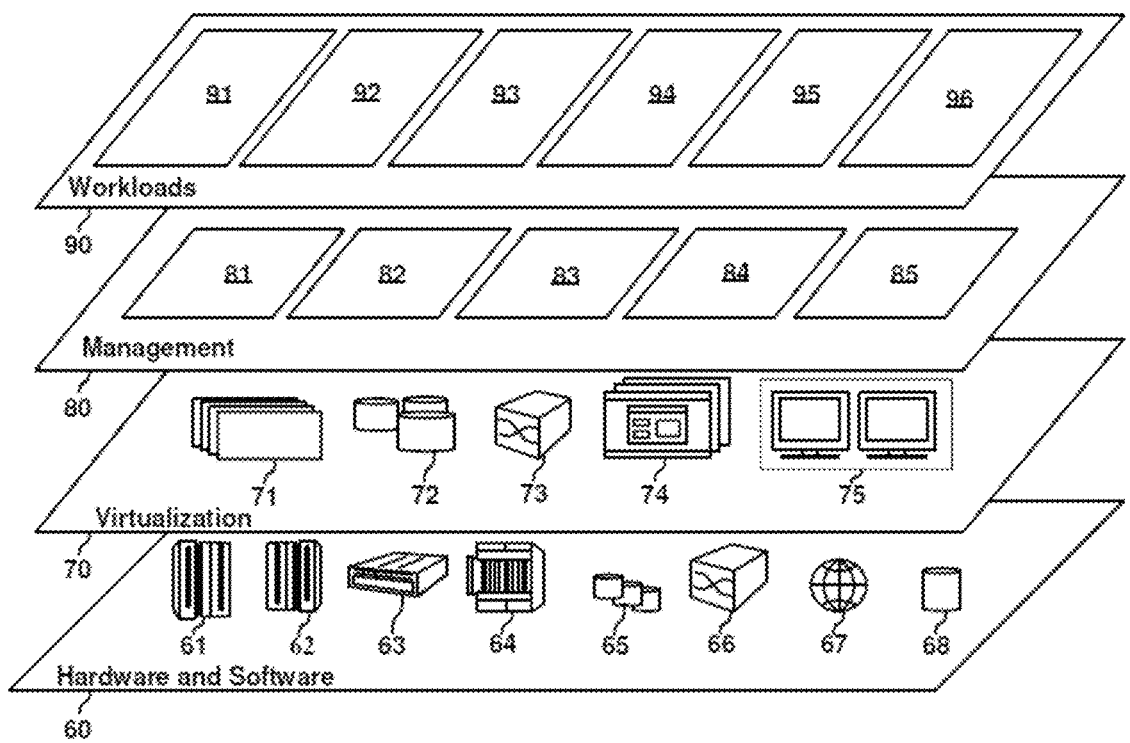
FIG. 2 depicts abstraction model layers in accordance with one or more embodiments described herein.

Referring now to FIG. 2, a set of functional abstraction layers provided by cloud computing environment 50 is shown. Repetitive description of like elements employed in other embodiments described herein is omitted for sake of brevity. It should be understood in advance that the components, layers, and functions shown in FIG. 2 are intended to be illustrative only and embodiments of the invention are not limited thereto. As depicted, the following layers and corresponding functions are provided. Repetitive description of like elements employed in other embodiments described herein is omitted for sake of brevity.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alert event tracking and predicting 96. Various embodiments of the present invention can utilize the cloud computing environment described with reference to FIGS. 1 and 2 to facilitate tracking and/or predicting one or more alert events.

Throughout one's life and daily routines, forgetfulness can result in accidents that can cause harm and/or inconvenience to an individual and/or others. For example, forgetting the location of a dependent can cause harm to the dependent. As used herein, a "dependent" can refer to a person and/or thing that relies on another for his/its caretaking and continued well-being. Example dependents can include, but are not limited to, a minor, a senior person, and/or a pet. For example, forgetting that a dependent is located in a vehicle can result in the dependent being left in the vehicle and subjected to undesirable environmental conditions.

Conventional systems attempt to assist an individual in avoiding forgetfulness by alerting the individual once a mistake (e.g., an alert event) is detected. However, conventional systems rely on the individual to regularly implement the systems, pay attention to the alerts, and act to remedy the mistakes in a timely fashion. Thus, conventional systems are exposed to the phenomenon known as single point of failure (SPOF), wherein the forgetful individual can be the SPOF which renders the system ineffective.

Various embodiments of the present invention can be directed to computer processing systems, computer-implemented methods, apparatus and/or computer program products that facilitate the efficient, effective, and autonomous (e.g., without direct human guidance) detection and/or prediction of an alert event along with the generation of alerts aimed at remedying and/or avoiding the alert event. As used herein "caregiver" can refer to one or more individuals that are responsible for the health and/or well-being of a subject dependent. Also, as used herein "alert event" can refer to an action by a subject caregiver that can result in the caregiver forgetting one or more parameters regarding a dependent (e.g., the dependent's location).

For example, in one or more embodiments described herein can detect that a dependent has left a reasonable distance from the caregiver, determine whether the dependent is in the proximity of another caregiver, and generate an alert (e.g., a notification regarding the dependent's lack of proximity to a caregiver) for the caregiver in response to determining that the dependent is not in the proximity of another caregiver. In another example, in one or more embodiments the present invention can analyze a caregiver's schedule, track the caregiver's location, identify any deviations from the caregiver's schedule based on the caregiver's location, determine if the deviations have, or are likely to, caused an alert event, and generate an alert (e.g., a notification regarding the location of the dependent) for the caregiver in response to determining that the deviation has, or is likely to, resulted in an alert event.

The computer processing systems, computer-implemented methods, apparatus and/or computer program products employ hardware and/or software to solve problems that are highly technical in nature (e.g., related to autonomous tracking and/or predicting of one or more alert events via one or more hubs associated with one or more caregivers and dependents), that are not abstract and cannot be performed as a set of mental acts by a human. Humans are inherently forgetful and one or more embodiments of the present invention can facilitate avoiding alert events by autonomously monitoring one or more caregivers in association with one or more dependents. The autonomous nature of one or more embodiments of the present invention overcomes the errors caused by an individual's inherently forgetful nature. Further, one or more embodiments of the present invention can utilize modern technologies (e.g., social media analysis techniques) to facilitate avoiding an alert event with novel to overcome occurrences wherein a caregiver is a single point of failure.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 3:
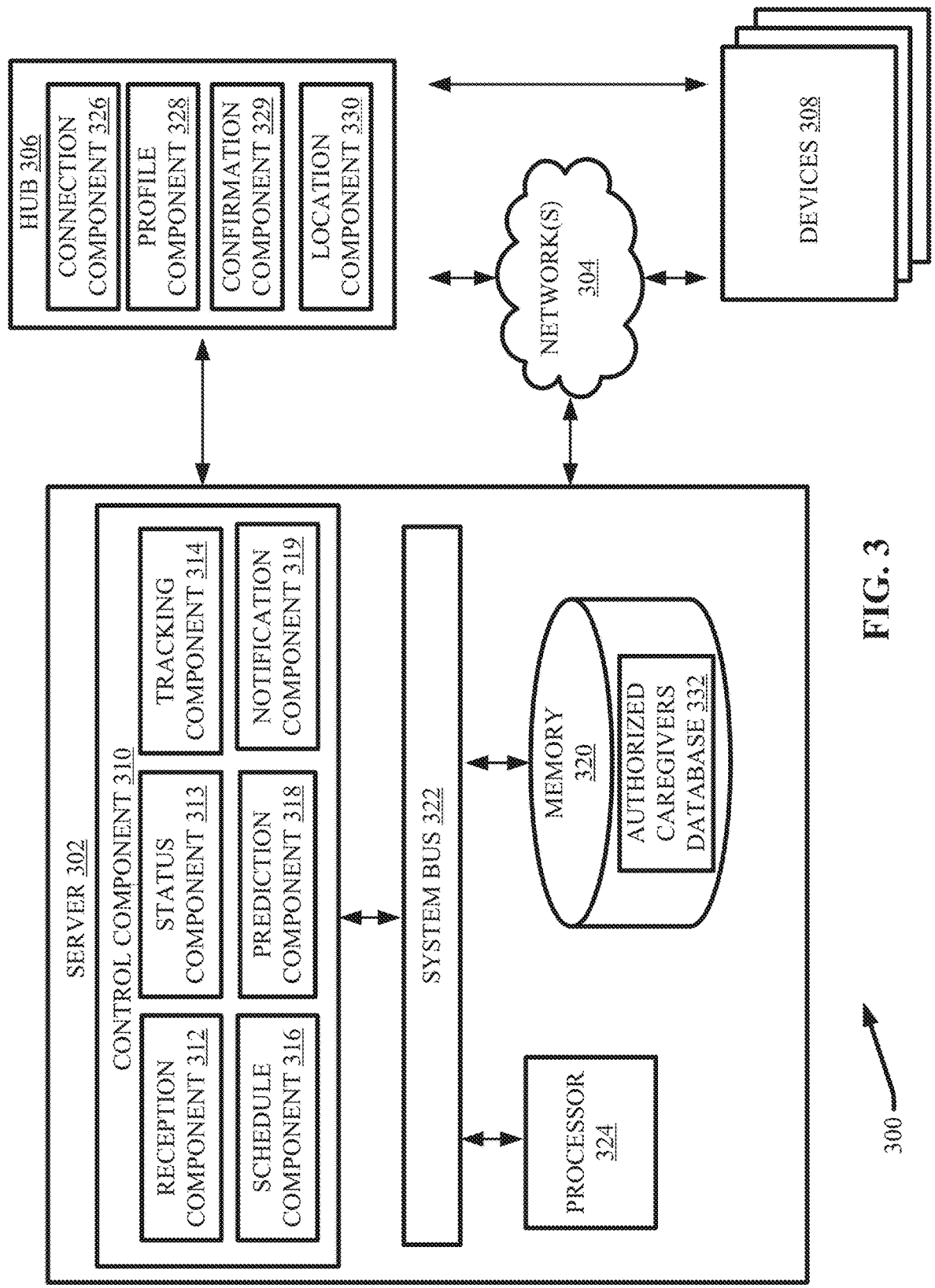
FIG. 3 illustrates a block diagram of an example, non-limiting system that can facilitate autonomously tracking and/or predicting an alert event in accordance with one or more embodiments described herein.

FIG. 3 illustrates a block diagram of an example, non-limiting system 300 that can detect and/or predict a caregiver's alert event to facilitate the prevention of harm to a dependent. Repetitive description of like elements employed in other embodiments described herein is omitted for sake of brevity. Aspects of systems (e.g., system 300 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 3, the system 300 can comprise one or more servers 302, one or more networks 304, one or more hubs 306, and/or one or more devices 308. The server 302 can comprise control component 310. The control component 310 can further comprise reception component 312, status component 313, tracking component 314, schedule component 316, prediction component 318, and/or alert component 319. Also, the server 302 can comprise or otherwise be associated with at least one memory 320. The server 302 can further comprise a system bus 322 that can couple to various components such as, but not limited to, the control component 310 and associated components, memory 320 and/or a processor 324. While a server 302 is illustrated in FIG. 3, in other embodiments, multiple devices of various types can be associated with or comprise the features shown in FIG. 3. Further, the server 302 can communicate with the cloud environment depicted in FIGS. 1 and 2 via the one or more networks 304.

One or more of the hubs 306 can comprise connection component 326, profile component 328, confirmation component 329, and/or location component 330. The one or more hubs 306 can be one or more respective devices (e.g., computer devices and/or electronic devices) operable by one or more entities (e.g., caregivers). Example hubs 306 can include, but are not limited to, personal computers, smart phones, computer tablets, and/or the like. The one or more hubs 306 can be electrically coupled to the one or more servers 302, and/or the hubs 306 can communicate with the one and/or more servers 302 via the one or more networks 304. Also, the one or more hubs 306 can be electrically coupled to the one or more devices 308, and/or the hubs 306 can communicate with the one or more devices 308 via the one or more networks 304.

The one or more networks 304 can comprise wired and wireless networks, including, but not limited to, a cellular network, a wide area network (WAN) (e.g., the Internet) or a local area network (LAN). For example, the server 302 can communicate with one or more hubs 306 (and vice versa) using virtually any desired wired or wireless technology including for example, but not limited to, cellular, WAN, wireless fidelity (Wi-Fi), Wi-Max, WLAN, Bluetooth technology, a combination thereof, and/or the like. Further, although in the embodiment shown the control component 310 can be provided on the one or more servers 302, it should be appreciated that the architecture of system 300 is not so limited. For example, the control component 310, or one or more components of control component 310, can be located at another computer device, such as another server device, a client device, etc.

The connection component 326 can detect one or more connections between the respective hub 306 comprising the connection component 326 and one or more devices 308. The one or more devices 308 can be computerized devices such as, but not limited to, personal computers, smart phones, computer tablets, and/or the like. For example, one or more of the devices 308 can be a wearable computer device such as, but not limited to, a smart watch (e.g., a watch comprising a processor and/or configured to execute an operating system), smart eyewear (e.g., eyewear comprising a processor and/or configured to execute an operating system), a smart bracelet (e.g., a bracelet comprising a processor and/or configured to execute an operating system), and/or the like. One or more of the devices 308 can be worn, carried, and/or otherwise associated with one or more entities (e.g., dependents). Also, the one or more devices 308 can communicate with one or more hubs 306. The devices 308 can be electrically coupled to the hubs 306 or communicate via the one or more networks 304. The devices 308 can be on the person (e.g., worn and/or carried) of a dependent. Since the device 308 is at the same and/or near the location of the dependent, a proximity of the dependent to a hub 306 and/or a hub 306 location can be determined by the system 300 as further elaborated below.

For example, the device 308 can be a wearable device (e.g., a smart watch, smart eyewear, a smart bracelet, and/or the like) worn and/or carried by a dependent and can be connected to a hub 306 via a network 304 (e.g., a BLUETOOTH® connection). In another example, the device 308 can be a computer tablet (e.g., a tablet computer comprising a processor and/or executing an operating system) that can be carried by a dependent and can be connected to a hub 306 via a network 304 (e.g., a BLUETOOTH® connection and/or a Wi-Fi connection).

The connection component 326 can identify one or more connections made by the hub 306. Also, the connection component 326 can determine which connections made by the hub 306 are with a device 308. Further, in one or more embodiments, the connection component 326 can recognize one or more devices 308 as being associated with one or more dependents. Additionally, in one or more embodiments, the connection component 326 can measure a strength of a connection between the hub 306 and one or more devices 308. For example, the connection component 326 can identify three active connections made by a hub 306 (e.g., a connection to a vehicle, a connection to a computer tablet, and a connection to a smart watch); recognize one or more of the connections as a device 308 associated with one or more dependents (e.g., the connection with the smart watch); and/or measure the strength of the connection between the hub 306 and the device 308 (e.g., smart watch).

The profile component 328 can receive information regarding one or more caregivers, one or more dependents, one or more schedules of the caregivers and/or dependents, and/or one or more routines of the caregivers and/or dependents. In various embodiments, the profile component 328 can receive one or more inputs from an operator of a hub 306 (e.g., a caregiver), wherein the inputs can include, but are not limited to, a caregiver's relation to the dependent; a caregiver's schedule (e.g., daily schedule); a route a caregiver takes to fulfill a schedule (e.g., a driving route); a location, type, and/or name of school attended by a subject dependent; the age of a caretaker and/or dependent; the name of a caregiver and/or dependent; a list of one or more caregivers authorized to associate with a subject dependent; an occupation of one or more caregivers; a workplace of one or more caregivers; and/or a home of one or more caregivers and/or dependents. For example, the profile component 328 can receive a schedule regarding one or more caregivers and/or one or more dependents. The schedule can comprise locations and/or dates of events to be attended by one or more caregivers and/or dependents over a period of time (e.g., the day, the week, the month, etc.). In another example, a caregiver can enter into the profile component 328 of a hub 306 (e.g., a smart phone) a schedule for the day conveying that a dependent of the caregiver attends daycare at a location named "Happy People" on Pearl Road at 9:00 a.m., and the caregiver attends work at "XYZ Accounting" on Grafton Road at 9:30 a.m.

The location component 330 can track the past and/or present location of the hub 306. For example, the location component 330 can utilize global positioning systems (GPS) to determine one or more positions of the hub 306. The location component 330 can track the position of the hub 306 to identify routes taken by the hub 306 (e.g., driving routes) and locations visited by the hub 306.

The reception component 312 can receive data from the hub 306 either directly or via the network 304. The data can describe or indicate one or more connections detected by the connection component 326, information received by the profile component 328, and/or one or more locations tracked by the location component 330. For example, the reception component 312 can receive data from the hub 306, indicating a connection between the hub 306 and a device 308 (e.g., a smart watch worn by a dependent) has been established or terminated. In another example, the reception component 312 can receive one or more schedules from the hub 306 indicating one or more events that one or more caregivers and/or dependents plan to attend, along with dates and/or locations for the events. In a further example, the reception component 312 can receive one or more locations from the hub 306 indicating positions visited by the hub 306 and/or routes traveled by the hub 306.

Further, the reception component 312 can store all or some of the received data within the memory 320. For example, the memory 320 can comprise an authorized caregivers database 332. The authorized caregivers database 332 can contain information regarding one or more dependents and one or more caregivers associated with the subject dependents. As used herein "authorized caregiver" can refer to a caregiver that is identified as authorized to provide care and/or supervision of a subject dependent at a given place and/or time. For example, information received from the profile component 328 and sent to the reception component 312 can be stored in the authorized caregivers database 332, wherein the information can comprise, but is not limited to, the name of one or more caregivers, the name of one or more dependents, an identification of caregivers that can authorized to be responsible for subject dependents, an identification of hubs 306 that can be associated with which caregivers, and/or an identification of devices 308 that can be associated with one or more dependents. Also, the authorized caregivers database 332 can comprise time and/or location parameters that must exist for a subject caregiver to be considered an authorized caregiver (e.g., a subject caregiver can considered an unauthorized caregiver on weekends but not weekdays). Information regarding one or more caregivers and their respective authorization status can be provided by an operator of a hub 306 via the profile component 328. Also, the profile component 328 can require security credentials from an operator of a hub 306 prior to accepting information regarding one or more caregivers and their respective authorization.

The status component 313 can analyze data received by the reception component 312 to determine the status of one or more devices 308. For example, the status component 313 can determine if a device 308 is connected to a hub 306 associated with an authorized caregiver for the dependent. The status component 313 can be electrically coupled to the reception component 312 and/or communicate with the reception component 312 via one or more networks 304. Further, the status component 313 can be electrically coupled to the authorized caregivers database 332 and/or communicate with the authorized caregivers database 332 via one or more networks 304. The status component 313 can determine the status of one or more devices 308 in response to the reception component 312 receiving data that one or more connections between a hub 306 and a device 308 have been established or terminated. Further, the status component 313 can determine the status of one or more devices 308 in response to the reception component 312 receiving data regarding one or more inputs from an operator (e.g., a caregiver of a hub 306). For example, the status component 313 can determine that the status of a device 308 as "connected" or "disconnected." A status of "connected" can indicate that the subject device 308 is connected to one or more hubs 306; whereas a status of disconnected can indicate that the subject device 308 is not connected to one or more hubs 306.

In one or more embodiments, the status component 313 can also determine which hub 306 a subject device 308 is connected to, and whether the connected hub 306 is associated with an authorized caregiver. For example, the status component 313 can determine the status of a subject device 308 as "authorized connected," "unauthorized connected," or "disconnected." A status of "authorized connected" can indicate that the subject device 308 is connected to a hub 306, and the hub 306 is associated with an authorized caregiver (e.g., as identified by the authorized caregivers database 332). A status of "unauthorized connected" can indicate that the subject device 308 is connected to a hub 306, but the hub 306 is not associated with an authorized caregiver (e.g., as identified by the authorized caregivers database 332).

Tracking component 314 can identify a relative location of one or more devices 308. Once the status component 313 determines that a device 308 is connected to a hub 306 (e.g., irrespective of whether the hub 306 is associated with an authorized or unauthorized caregiver), the tracking component 314 can identify the location of the hub 306 (e.g., via the location data received by the reception component 312 from the location component 330) and therefore a proximate location of the device 308. The proximate location of the device 308 can be determined based at least on the rationale that the device 308 must be a reasonable distance (e.g., equal to or less than 350 feet) from the subject hub 306 in order to connect to the hub 306.

Schedule component 316 can analyze one or more inputs received by the profile component 328 and sent to the reception component 312 to determine one or more schedules for one or more devices 308 associated with a dependent. The schedule component 316 can be electrically coupled and/or communicatively coupled to the reception component 312 and/or communicate with the reception component 312 via one or more networks 304. Further, the schedule component 316 can be electrically coupled to the authorized caregivers database 332 and/or communicate with the authorized caregivers database 332 via one or more networks 304.

Prediction component 318 can determine whether a caregiver is likely to commit an alert event involving a dependent based on the data received by the reception component 312, the status determined by the status component 313, the location of the device 308 determined by the tracking component 314, and/or the schedule determined by the schedule component 316. The prediction component 318 can analyze deviations from a determined schedule, by one or more hubs 306 and/or devices 308, and determine a probability that the deviations can result in an alert event.

For example, a schedule determined by the schedule component 316 can comprise a dependent attending an elementary school at 9:00 am and a caregiver of the dependent attending work at 9:30 am. Also, the status component 313 can determine that a device 308 associated with the subject dependent is connected to a hub 306 associated with an authorized caregiver of the subject dependent. Further, the tracking component 314 can determine that the hub 306 is traveling a typical route to work rather than a typical route to the elementary school. Thus, the prediction component 318 can analyze the parameters of the example explained above, and can determine that the caregiver is likely to forget to take the dependent to the elementary school. In various embodiments the prediction component 318 can determine a probability that a subject caregiver will commit an alert event.

Alert component 319 can generate and/or send one or more alert signal to one or more hubs 306 that cause the hubs 306 to generate one or more notifications. The notifications (e.g., messages such as, but not limited to, a test message, noises such as, but not limited to, an audible command, and/or visual displays such as, but not limited to, a digital image) can inform one or more caregivers of the occurrence and/or probability of an alert event. The alert component 319 can generate and/or send alert signals based on a determined status of a device 308 and/or a prediction determined by the prediction component 318. For example, the alert component 319 can generate an alert signal that causes a hub 306 to generate a notification that requests an operator of the hub 306 to verify the location of a dependent in response to a determination by the status component 313 that a device 308 associated with the dependent has changed status from connected to a hub 306 to not connected to a hub 306. In another example, the alert component 319 can generate and/or send an alert signal if a signal strength of a connection between a device 308 and a hub 306 deteriorates below a strength threshold (e.g., below 20 percent). Example strength threshold can comprise, but are not limited to, a percent in the range of 1 to 50 percent.

In another example, the alert component 319 can generate and/or send an alert signal if a percent probability determined by the prediction component 318 is higher than a probability threshold (e.g., a percent probability of 50 percent or greater that a caretaker will commit an alert event involving a dependent). Example probability thresholds can comprise, but are not limited to, 30 to 100 percent. In a further example, the alert component 319 can generate and/or send an alert signal in response to the status component 313 determining that a device 308 associated with a dependent is solely connected to an unauthorized caregiver.

In one or more embodiments, the alert component 319 can generate and/or send an alert signal to a single hub 306 or multiple hubs 306 (e.g., either through direct electrical connection or via one or more networks 304). Also, the alert component 319 can generate and/or send an alert signal to one or more hubs 306 simultaneously, or to a single hub 306 first and then subsequent hubs 306 at a later time. For example, the alert component 319 can generated and/or send an alert signal to a first hub 306 that was last connected to a subject device 308, as determined by status component 313, and then to additional hubs 306 associated with the device 308, in accordance with the authorized caregivers database 332, in response to not receiving a confirmation receipt from the first hub 306.

In various embodiments, the alert signal can cause the generated notification to include information regarding for example, but not limited to, the subject dependent, associated caregivers (authorized caregivers and/or unauthorized caregivers), one or more devices 308 associated with the subject dependent, and/or one or more hubs 306 associated with the subject dependent. For example, an alert signal generated and/or sent by the alert component 319 can cause the generation of a notification comprising the example message "Hello # caregiver, the # device 308 associated with # dependent is no longer connected to you or another caregiver." In the example message: "# caregiver" can be the name of the caregiver associated with the hub 306 receiving the notification; "# device 308 can be information regarding one or more devices 308 associated with the subject dependent (e.g., the type of device 308); and "# dependent" can be the name of the subject dependent.

In various embodiments, the confirmation receipt can be a reply indicating that the notification was seen and/or read by a caregiver. Confirmation of the receipt of the notification can be conveyed to the alert component 319 from a hub 306 via confirmation component 329. For example, a caregiver operating a hub 306 that has received a notification can select the confirmation component 329 (e.g., a button and/or touch screen selection) to send a confirmation receipt to the alert component 319 (e.g., via the one or more networks 304).

The alert component 319 can repeatedly send the alert signal to a hub 306 at defined time intervals (e.g., every two minutes) until a confirmation receipt is received from the confirmation component 329 (e.g., via the one or more networks 304 and/or the reception component 312). Also, the alert component 319 can send an alert signal to additional hubs 306 associated with a subject dependent in response to not receiving a confirmation receipt within an allotted time (e.g., five minutes). In various embodiments, an operator of a hub 306 can set a desired time interval regarding repeat notifications and/or notifications to additional hubs 306 via the profile component 328. Additionally, when sending an alert signal to additional hubs 306, the alert component 319 can send the alert signal to all the additional hubs 306 simultaneously or to additional hubs 306 one at a time in accordance with a prioritization stored in the authorized caregivers database 332. The alert component 319 can stop generating and/or sending alert signals regarding an alert event in response to receiving a confirmation receipt for a notification regarding the subject alert event.

Figure 4A:
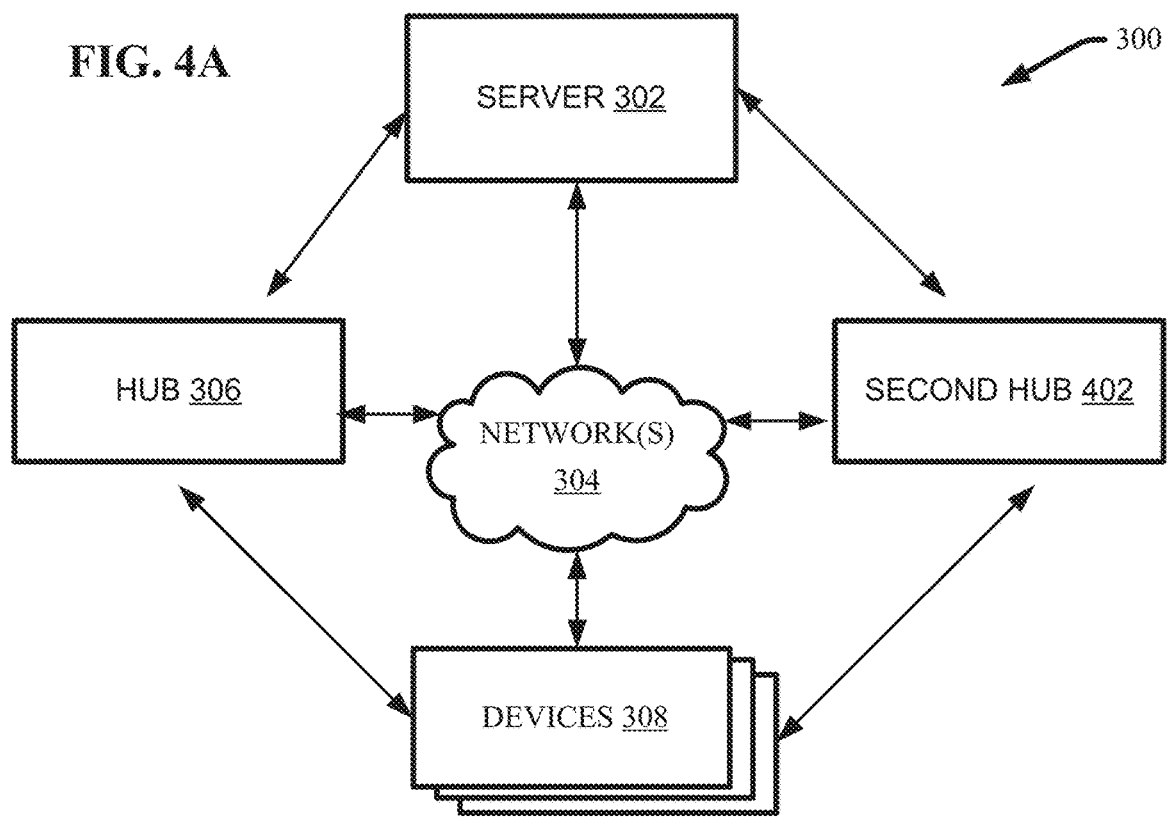
FIG. 4A illustrates another block diagram of an example, non-limiting system that can facilitate autonomously tracking and/or predicting an alert event by utilizing multiple hubs in accordance with one or more embodiments described herein.

FIG. 4A illustrates a block diagram of the example, non-limiting system 300 that can comprise one or more second hubs 402. Repetitive description of like elements employed in other embodiments described herein is omitted for sake of brevity. FIG. 4A further exemplifies that the system 300 can comprise multiple hubs (e.g., hub 306 and second hub 402). Second hub 402 can comprise the components and perform the features described above with regard to hub 306. In various embodiments, the server 302 can receive and analyze data from both hub 306 and one or more second hubs 402 in combination.

In one or more embodiments, the status component 313 can monitor the status of one or more devices 308 in relation to hub 306 and/or one or more second hubs 402. For example, if status component 313 identifies that a connection between a device 308 and hub 306 has been terminated, the status component 313 can analyze data received by the reception component 312 from one or more second hubs 402 associated with the device 308, in accordance with the authorized caregivers database 332, to determine whether the device 308 is connected to the one or more second hubs 402. Also, the status component 313 can automatically update the status of a device 308 in response to determining a change in the strength of the device's 308 connection and/or a change of the hub 306 and/or second 402 connected to the device 308. In various embodiments, the status component 313 can check the status of one or more devices 308 in allotted time intervals (e.g., every couple of seconds). In one or more embodiments, the status component 313 can check the status of one or more devices 308 in response to the reception component 312 receiving data from a hub 306 or another hub 306 associated with the device 308.

In one or more embodiments, the tracking component 314 can track the relative location of one or more devices 308 in relation to hub 306 and/or one or more second hubs 402. Tracking component 314 can determine a location of a device 308, and thereby an associated dependent, relative a hub 306 and/or second hub 402 connected to the device 308. The tracking component 314 can switch which hub 306 and/or second hub 402 being tracked to determine the location of a device 308 in response to a determination by the status component 313 that the subject device 308 is no longer connected to a hub 306 and/or second hub 402 and now connected to another hub 306 and/or second hub 402.

Thus, the tracking component 314 can change which hub 306 and/or second hub 402 the tracking component 314 is tracking so as to tack the hub 306 and/or second hub 402 currently connected to the subject device 308.

For example, a hub 306 can be associated with a first caregiver transporting a dependent (e.g., a minor) to a location (e.g., a school) and a second hub 402 can be associated with a second caregiver at the location (e.g., a teacher). During transportation, a device 308 (e.g., a smart watch) associated with a subject dependent can be connected to the hub 306, and the tracking component 314 can track the location of the hub 306 to determine the relative location of the dependent. After the caregiver drops-off the subject dependent at the location, the device 308 can disconnect with the hub 306 and connect to the second hub 402. The status component 313 can update the status of the subject device 308 to indicate the device's 308 disconnect with the hub 306 and new connection with the second hub 402. In response to the updated status determined by the status component 313, the tracking component 314 can change from tracking the hub 306 to tracking the second hub 402 to determine the relative location of the device 308 and associated dependent.

In one or more embodiments, the schedule component 316 can generate one or more schedules regarding one or more caregivers and/or dependents based on data received by the reception component 312 from a hub 306 and/or a second hub 402. The schedule component 316 can generate a schedule for one or more dependents, and the schedule can comprise data received from the hub 306 and/or the second hub 402. For example, a first caregiver can input a scheduled event for a dependent to attend via the profile component 328 of the hub 306. Also, a second caregiver can input an additional scheduled event for the dependent to attend via the profile component 328 of the second hub 402. The schedule component 316 can generate a schedule for the dependent that comprises both the scheduled event and the additional scheduled event. Thus, one or more caregivers can influence a schedule for one or more dependents generated by the schedule component 316 via inputs to the hub 306 and/or the second hub 402.

Figure 4B:
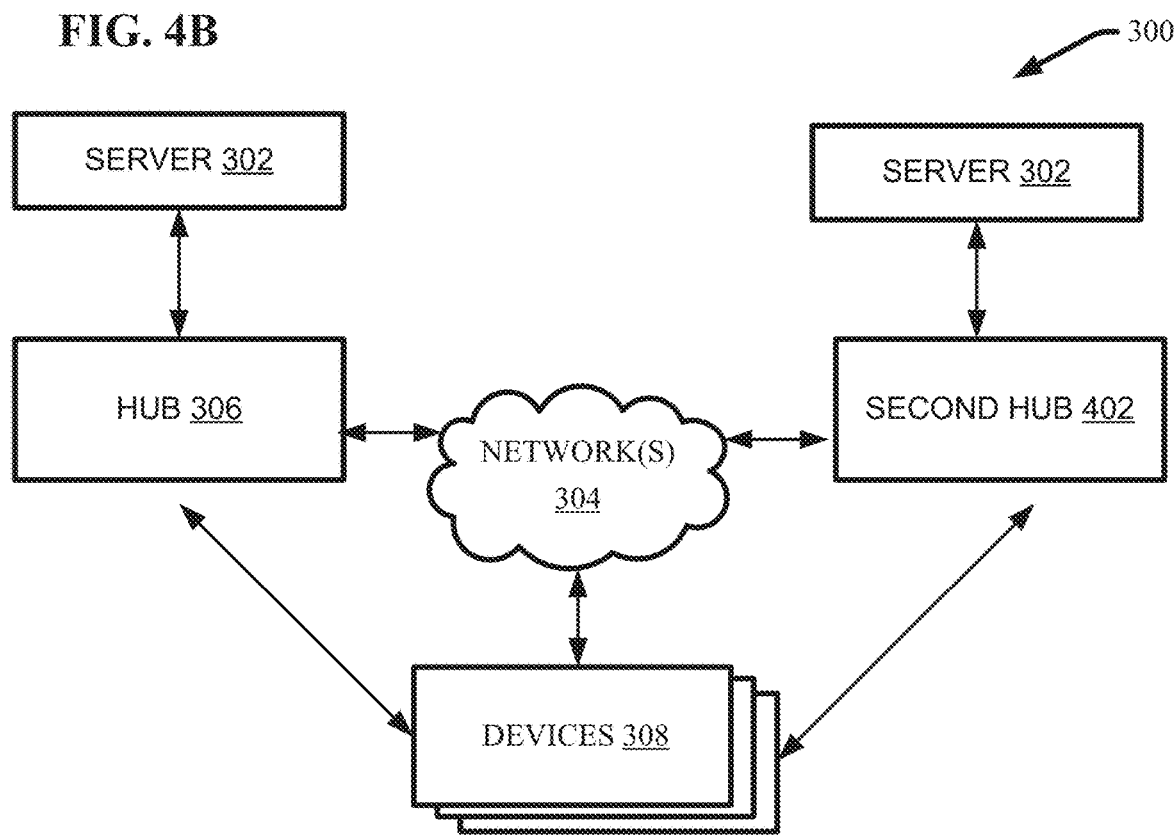
FIG. 4B illustrates another block diagram of an example, non-limiting system that can facilitate autonomously tracking and/or predicting an alert event by utilizing multiple hubs in accordance with one or more embodiments described herein.

FIG. 4B illustrates another block diagram of the example, non-limiting system 300 that can comprise one or more second hubs 402 that utilize blockchain technology. Repetitive description of like elements employed in other embodiments described herein is omitted for sake of brevity. In one or more embodiments, the system 300 can utilize blockchain technology to maintain decentralized ledgers of: one or more statuses determined by a status component 313; one or more locations determined by a tracking component 314; one or more schedules generated by a schedule component 316; and/or one or more predictions generated by a prediction component 318.

A hub 306 can be electrically coupled to a server 302, and one or more second hubs 402 can be electrically coupled to respective servers 302. As the associated components (e.g., status component 313, tracking component 314, schedule component 316, and/or prediction component 318) of a control component 310 generate outputs (e.g., a status of a device 308, a location of device 308, a schedule of a dependent, and/or a percent probability generated by a prediction component 318), the control component 310 can add the outputs as blocks to a blockchain via the one or more networks 304. Also, the control component 310 can associate each dependent with a unique blockchain. Further, each addition to the blockchain (e.g., update to a decentralized ledger comprising control component 310 outputs) can require a signature from each hub 306 and/or second hub 402 regarded by the addition. By utilizing blockchain technology, the hub 306 and one or more second hubs 402 can monitor the status of one or more dependent claims without relying on a central computing device.

For example, an addition to a blockchain regarding a device 308 disconnecting from a hub 306 and connecting to a second hub 402 can require an electronic signature (e.g., a confirmation) from both hub 306 and second hub 402. In the event that either hub 306 or second hub 402 withholds their respective electronic signature for a given time, a alert component 319 on the hub 306 and/or the second hub 402 can generate and/or send an alert signal that causes a notification to be generated at one or more hubs 306 and/or second hubs 402 associated with the subject device 308.

Figure 5A:
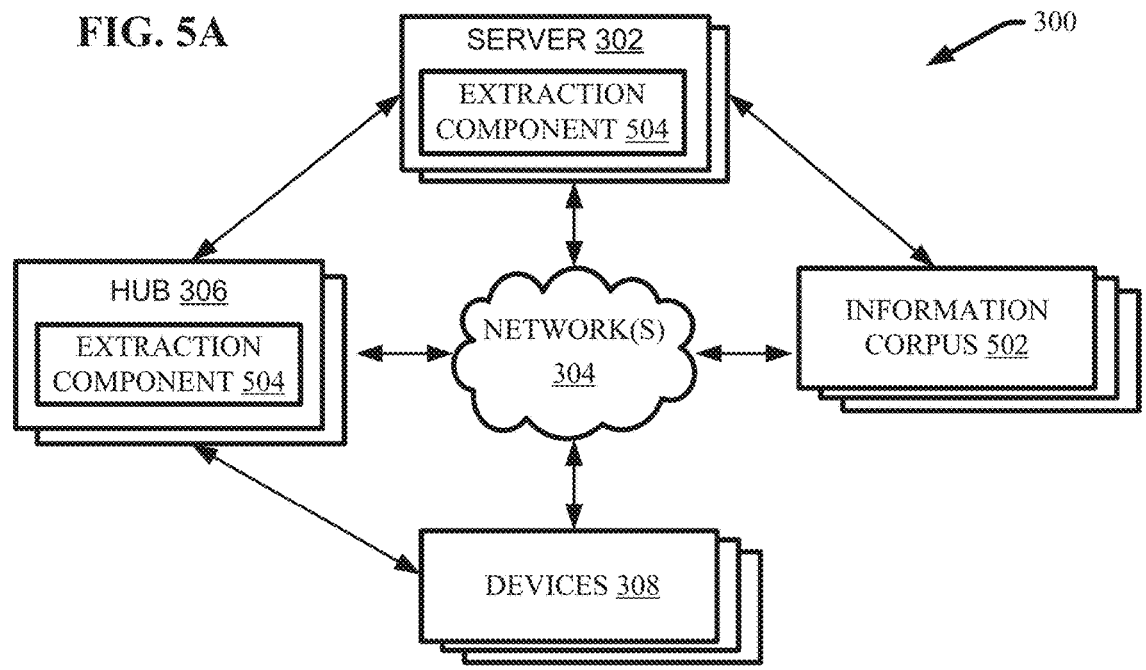
FIG. 5A illustrates a block diagram of an example, non-limiting system that can facilitate autonomously tracking and/or predicting an alert event by utilizing an information corpus in accordance with one or more embodiments described herein.

FIG. 5A illustrates a block diagram of an example, non-limiting system 300, in which one or more hubs 306 and/or one or more servers 302 can be in connection with one or more information corpuses 502 (e.g., via one or more networks 304). Repetitive description of like elements employed in other embodiments described herein is omitted for sake of brevity. An information corpus 502 can be a source of information regarding or involving one or more caregivers and/or one or more dependents. Example information corpuses 502 include, but are not limited to, text messages sent and/or received by a caregiver and/or dependent, social media posts (e.g., messages posted to FACEBOOK®, TWITTER®, and the like), and/or email correspondences.

In one or more embodiments, an operator of a hub 306 (e.g., a caregiver) can grant the hub 306 and/or the server 302 permission to access one or more information corpuses 502 via the profile component 328. Also, an operator of a hub 306 (e.g., a caregiver) can input credentials (e.g., username and password) that enable the hub 306 and/or server 302 to access an information corpus 502.

The server 302 and/or the hub 306 can further comprise one or more extraction components 504. The one or more extraction components 504 can identify and/or extract information from an information corpus 502. In various embodiments, the extraction component 504 can identify information in an information corpus 502 that regarding a schedule of one or more caregivers and/or one or more dependents. Further, the extraction component 504 can extract the identified information from the information corpus 502 (e.g., copy the identified information) and share the extracted information with one or more associate components of the control component 310 (e.g., via electrical coupling or one or more networks 304). The information extracted by the extraction component 504 can include social actions taken, and/or to be taken, by a caregiver. The social actions can be for example, but not limited to, events a caregiver plans to attend, places a caregiver plans to visit, and/or errands a caregiver plans to perform.

For example, the extraction component 504 can identify and/or extract information regarding a schedule of a caregiver and/or dependent from text messages sent and/or received by one or more caregivers. In another example, the extraction component 504 can identify information regarding a schedule of a caregiver and/or dependent from an Internet website (e.g., from messages posted by a caregiver to a website, from messages commented upon by a caregiver on a website, and/or from messages on a website that regard a caregiver). In another example, the extraction component 504 can read a test message from a caregiver stating, for example, "I am taking Johnny to school this morning," can identify "Johnny" as a dependent in the authorized caregivers database 332, and can extract the test message to share with the schedule component 316 whereupon the schedule component 316 can update a schedule regarding dependent Johnny and/or the caregiver to include the morning trip to school.

In various embodiments, the extraction component 504 can utilize word embedding techniques to identify and/or extract information regarding a caregiver and/or a dependent from natural language selections. In one or more embodiments, the extraction component 504 can extract information from scheduling/calendar applications operated on a computerized device and/or accessed via the Internet.

Figure 5B:
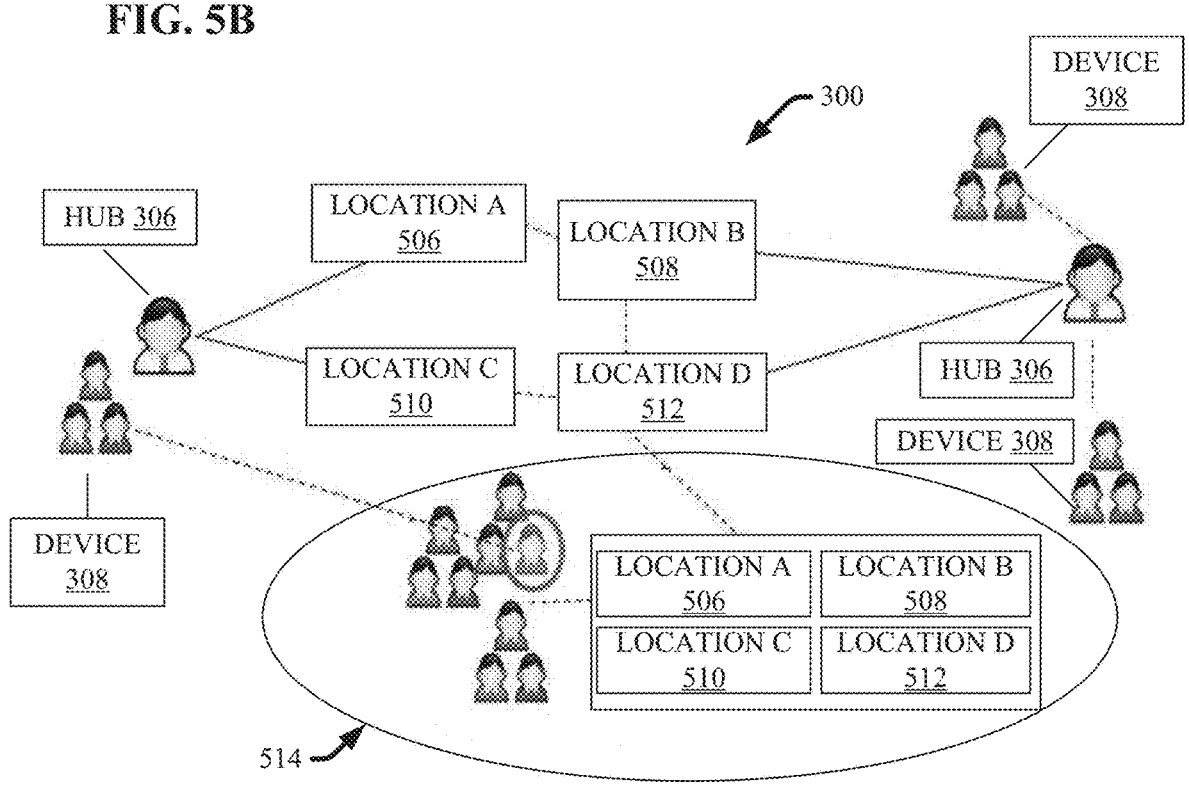
FIG. 5B illustrates a diagram of an example, non-limiting system that can associate one or more caregivers with one or more hubs and/or one or more dependents with one or more devices in accordance with one or more embodiments described herein.

FIG. 5B illustrates a diagram of the example, non-limiting system 300, that shows that the system 300 can associate one or more caregivers with one or more hubs 306 and/or one or more dependents with one or more devices 308. Repetitive description of like elements employed in other embodiments described herein is omitted for sake of brevity. As shown in FIG. 5(B), one or more caregivers can be connected to one or more dependents. Also, each caregiver can be connected to one or more hubs 306, and the dependents can be connected to one or more devices 308. Further, the control component 310 can determine that a caregiver is going to visit one or more locations (e.g., location A 506, location B 508, location C 510, and/or location D 512). For example, extraction component 504 can extract a text message sent by a caregiver confirming his/her attendance with one or more dependents at an event at location D 512, and thereby the schedule component 316 can generate schedule information including location D 512. Further, the tracking component 314 can track the location of a hub 306 associated with a caregiver to determine that the caregiver is traveling to location B 508 during the time he/she is scheduled to attend the event at location D 512. Additionally, the status component 313 can determine when one or more dependents are with the caregiver by identifying one or more connects between the hub 306 and device 308. Thus, prediction component 318 can identify the caregiver's traveling to location B 508 as a deviation from the schedule information and determine a probability that the deviation will result in an alert event.

The system 300 can monitor the status of multiple caregivers (e.g., via hub 306) connected to multiple dependents (e.g., via device 308). Since the status component 313 can determine the connection status of one or more devices 308, and the associated components of the control component 310 (e.g., tracking component 314, schedule component 316, prediction component 318, and/or extraction component 504) can track the current location of a hub 306 connected to the devices 308 and/or determine future locations the subject hub 306 will visit; the server 302 can determine a dependent location status 514. The dependent location status 514 can comprises each dependent and the dependent's: last location, current location, future planned location (e.g., from a generated schedule), and/or anticipated location (e.g., based on the current traveling path of a hub 306 connected to the dependent's device 308).

Figure 6:
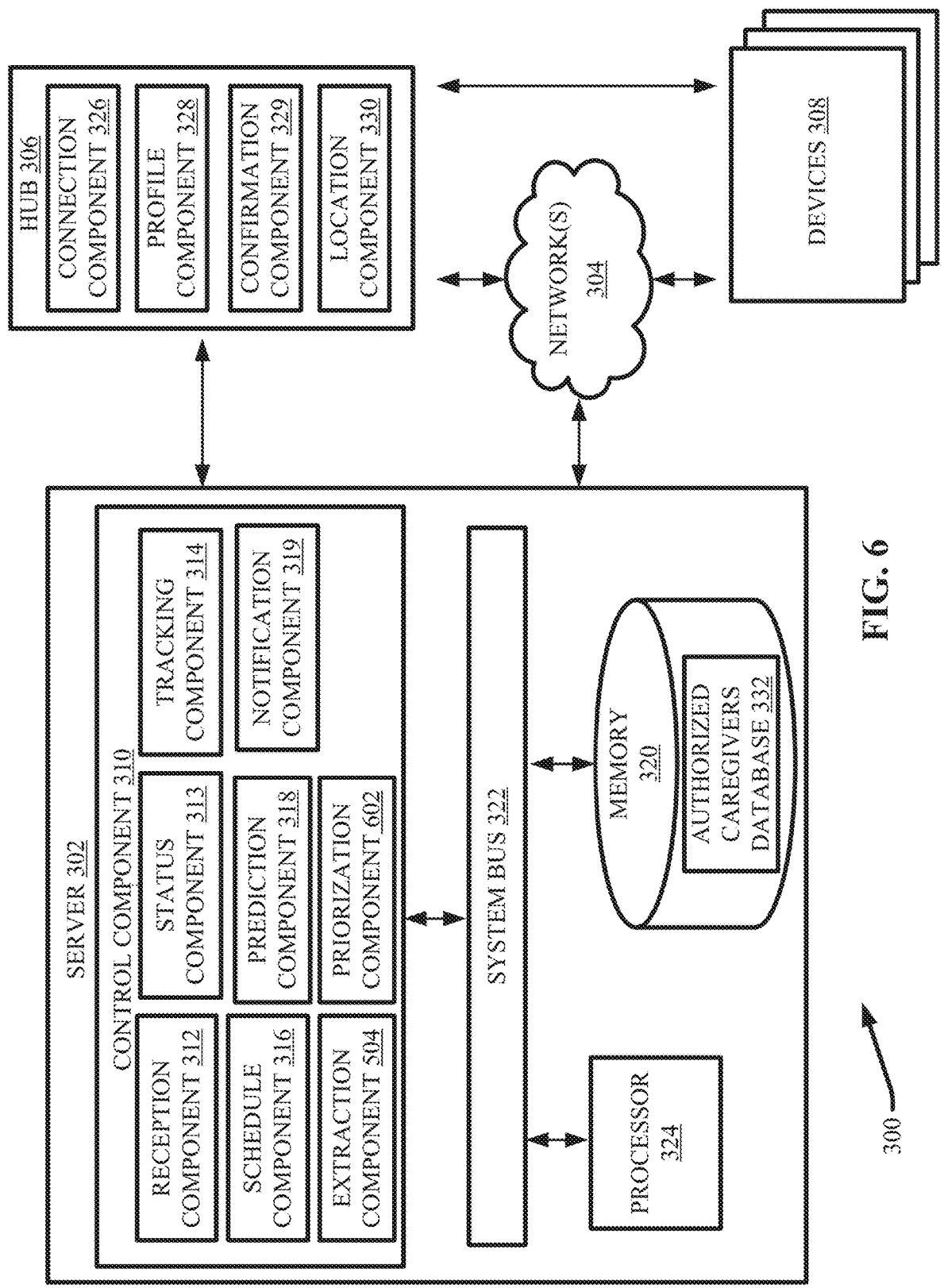
FIG. 6 illustrates a block diagram of an example, non-limiting system that can facilitate autonomously tracking and/or predicting an alert event in accordance with one or more embodiments described herein.

FIG. 6 illustrates a block diagram of the example, non-limiting system 300, that can further comprises prioritization component 602. Repetitive description of like elements employed in other embodiments described herein is omitted for sake of brevity. Prioritization component 602 can prioritize an importance of devices 308 associated and/or connected to a hub 306 to facilitate the determination of probability predication by the prediction component 318. The control component 310 can comprise the prioritization component 602, the prioritization component 602 can be electrically coupled to the server 302, and/or the prioritization component 602 can be communicate with the server 302 via one or more networks 304.

In various embodiments, the prioritization component 602 can prioritize one or more devices 308 associated with a hub 306 based on a likelihood that the device 308 is supposed to remain near the hub 306. The prioritization component 602 can also consider the location of the subject hub 306 when prioritizing the one or more devices 308. When a device 308 is connected to a hub 306 and highly prioritized at the current location of the hub 306, the prediction component 318 can determine a higher probability that a caregiver associated with the hub 306 will commit an alert event than if the highly prioritize device 308 for that location was not connected to the hub 306. The prediction component 318 can determine that a deviation from a schedule has occurred, or is about to occur, when a highly prioritized device 308 for a given location and another device 308 associated with a dependent are both connected to the same hub 306 at the given location.

For example, a laptop can be a first device 308 connected to a hub 306, and a smart watch worn by a dependent can be a second device 308 connected to the hub 306. The prioritization component 602 can determine that the laptop is of high priority when the hub 306 is located at a workplace of a caregiver associated with the hub 306. Thus, if the hub 306 travels to the caregiver's workplace while connected to the laptop and the smart watch, the prediction component 318 can determine a high probability that the caregiver will commit an alert event involving the dependent at the workplace location (e.g., go to work forgetting that the dependent has traveled with the caregiver).

In one or more embodiments, the prioritization component 602 can determine prioritization of one or more devices 308 based on past patterns regarding a subject hub 306, a subject device 308, and/or a subject location (e.g., a particular device 308 is near always connected to a particular hub 306 and a given location). In various embodiments, the prioritization component 602 can determine prioritization based on one or more inputs provided by an operator (e.g., caregiver) of a hub 306 via the profile component 328.

Figure 7:
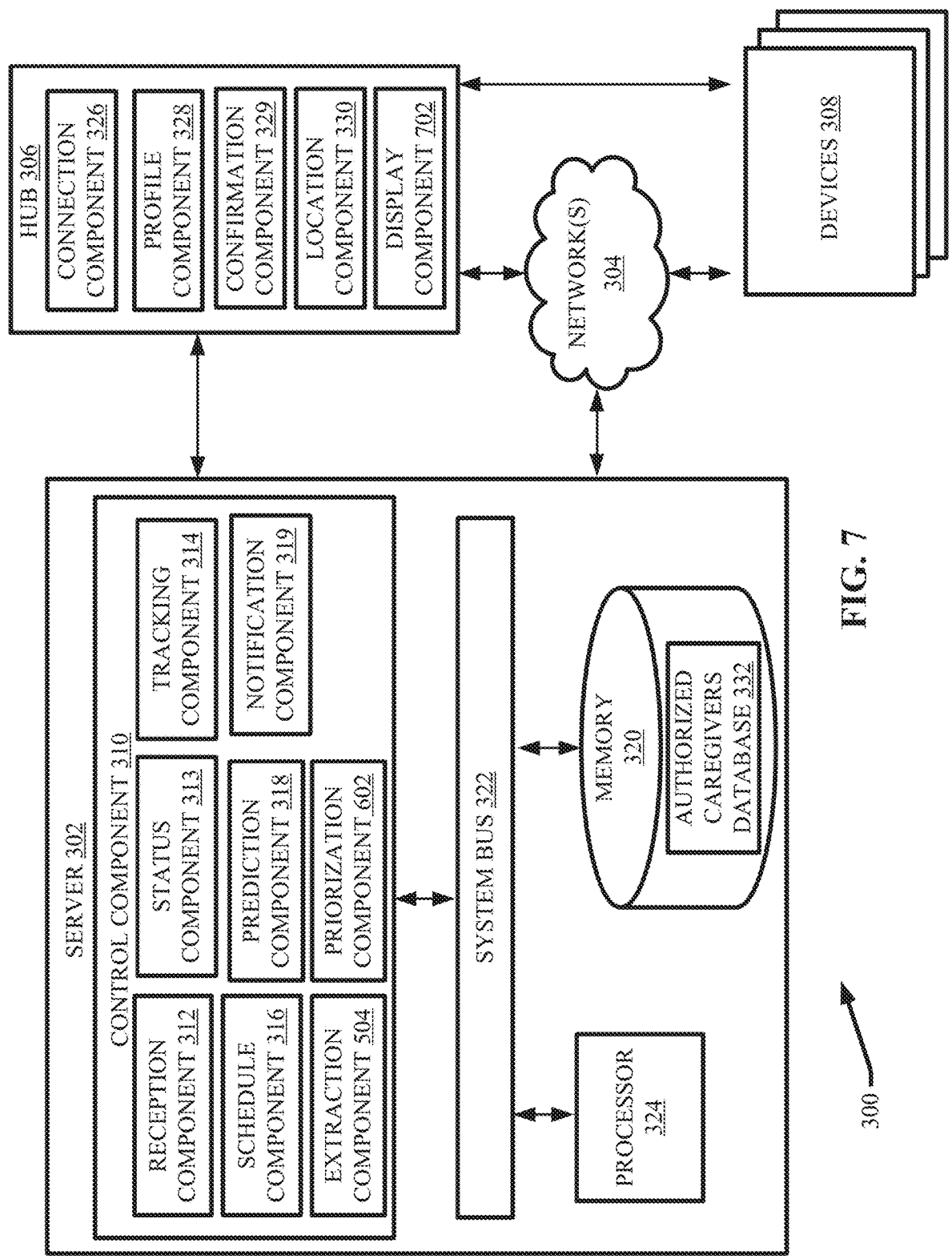
FIG. 7 illustrates a block diagram of an example, non-limiting system that can facilitate autonomously tracking and/or predicting an alert event in accordance with one or more embodiments described herein.

FIG. 7 illustrates a block diagram of an example, non-limiting system 300, that can further comprise display component 702. Repetitive description of like elements employed in other embodiments described herein is omitted for sake of brevity. The display component 702 can generate a display for an operator of a hub 306 (e.g., a caregiver) to view and/or interact with settings and/or outputs of the hub 306 and/or the server 302. The hub 306 can comprise the display component 702, the display component 702 can be electrically coupled to the server 302, and/or the display component 702 can be communicate with the server 302 via one or more networks 304.

The display component 702 can display, for example: one or more notifications sent by the alert component 319, one or more inputs provided via the profile component 328, one or more confirmation receipts generated by the confirmation component 329, one or more locations determined by the tracking component 314, and/or one or more connection statuses determined by the status component 313. Examples of the display component 702 can include, but are not limited to, one or more integrated screens comprising a hub 306, one or more external screens connected to a hub 306, and/or a combination thereof.

Figure 8:
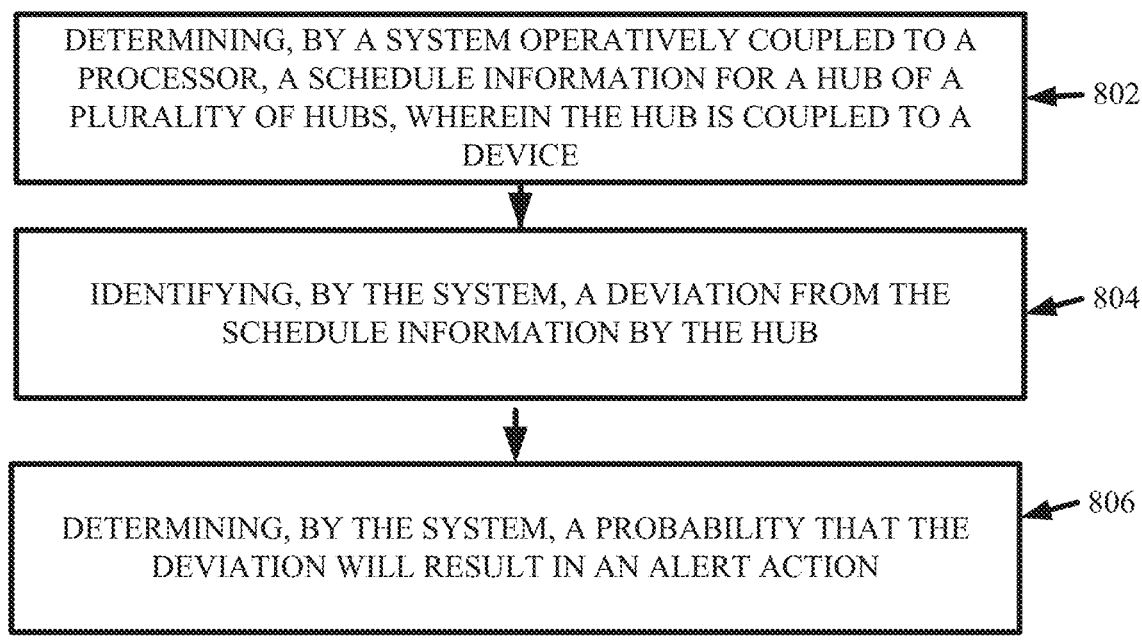
FIG. 8 illustrates a flow diagram of an example, non-limiting computer-implemented method that can facilitate autonomously tracking and/or predicting an alert event in accordance with one or more embodiments described herein.

FIG. 8 illustrates an example, non-limiting computer-implemented method 800 that facilitates automatically tracking and/or predicting alert events committed by a caregiver that can involve a dependent. At 802, the computer-implemented method 800 can comprise determining, by a system 300 operatively coupled to a processor 324, a schedule information for a hub 306 of a plurality of hubs 306, wherein the hub 306 is coupled to a device 308. At 804, the computer-implemented method 800 can further comprise identifying, by the system 300, a deviation from the schedule information by the hub 306. Also, at 806, the computer-implemented method 800 can comprise determining, by the system 300, a probability that the deviation will result in an alert action.

Figure 9:
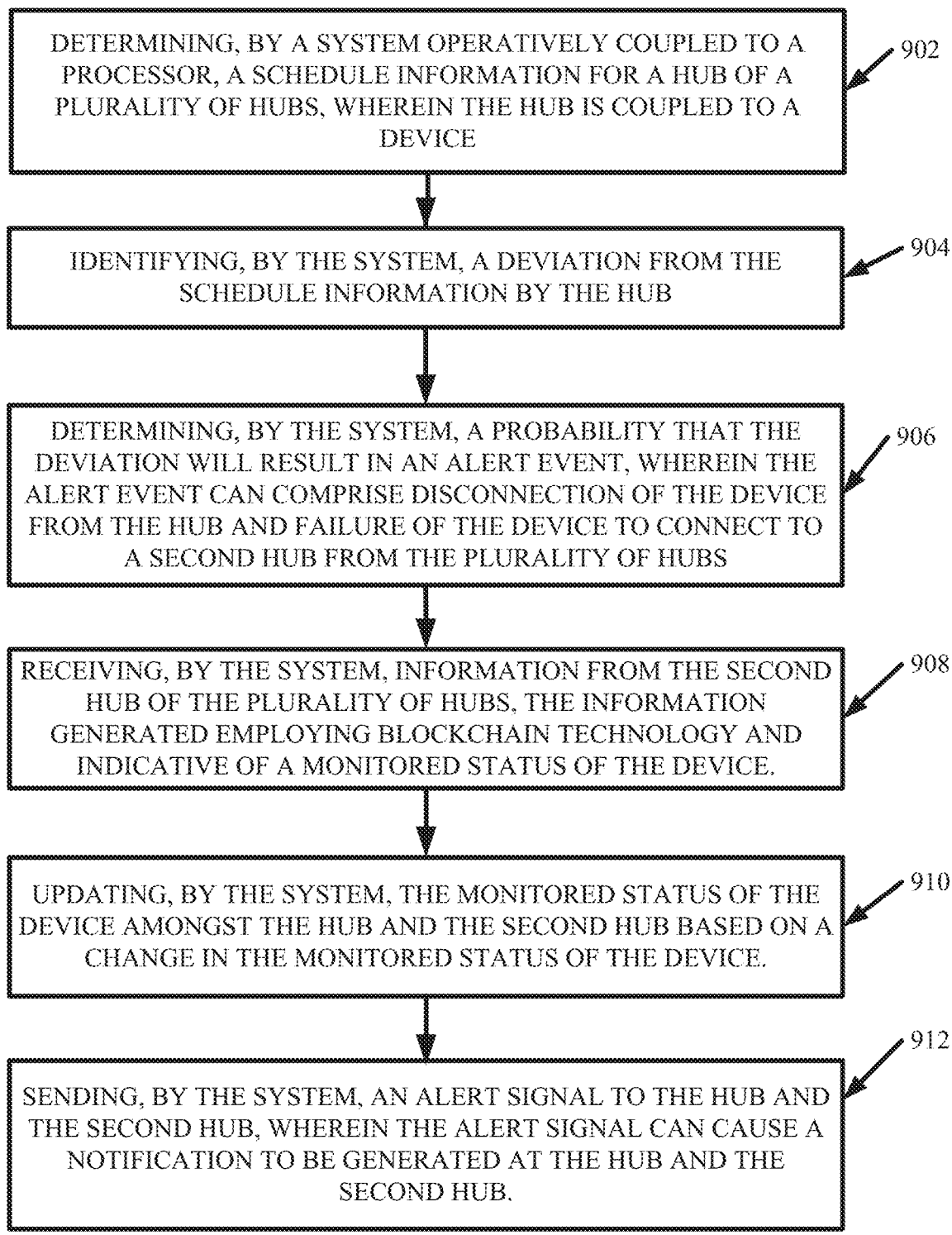
FIG. 9 illustrates another flow diagram of an example, non-limiting computer-implemented method that can facilitate autonomously tracking and/or predicting an alert event in accordance with one or more embodiments described herein.

FIG. 9 illustrates another example, non-limiting computer-implemented method 900 that facilitates automatically tracking and/or predicting alert events committed by a caregiver that can involve a dependent. At 902, the computer-implemented method 900 can comprise determining, by a system 300 operatively coupled to a processor 324, a schedule information for a hub 306 of a plurality of hubs 306, wherein the hub 306 is coupled (e.g., via a wireless network 304) to a device 308. At 904, the computer-implemented method 900 can further comprise identifying, by the system 300, a deviation from the schedule information by the hub 306. Also, at 906, the computer-implemented method 900 can comprise determining, by the system 300, a probability that the deviation will result in an alert event. The alert event can comprise, for example, disconnection of the device 308 from the hub 306 and failure of the device 308 to connect to another hub 306 (e.g., second hub 402) from the plurality of hubs 306. At 908, the computer-implemented method 900 can comprise receiving, by the system 300, information from the second hub 402 of the plurality of hubs 306, the information generated employing blockchain technology and indicative of a monitored status of the device 308. At 910, the computer-implemented method 900 can also comprise updating, by the system 300, the monitored status of the device 308 amongst the hub 306 and the second hub 402 based on a change in the monitored status of the device 308. Further, at 912, the computer-implemented method 900 can comprise sending, by the system 300, an alert signal to the hub 306 and the second hub 402, wherein the alert signal can cause a notification (e.g., a text message, a noise, an audio command, and/or a digital image) to be generated at the hub 306 and the second hub 402.

Figure 10:
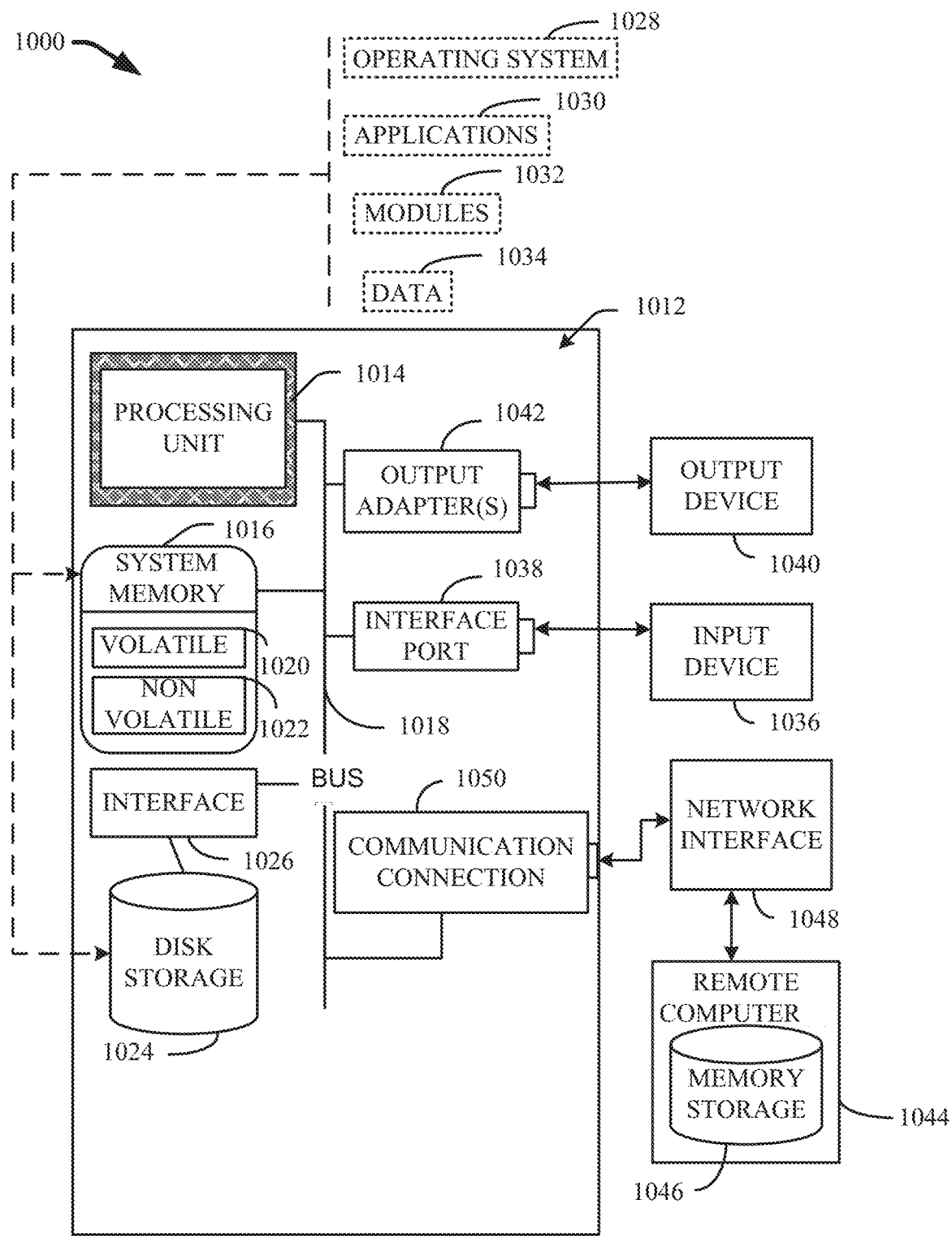
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a system operatively coupled to a processor, schedule information for a hub of a plurality of hubs, wherein the hub is communicatively coupled to a device;
   identifying, by the system, a deviation from the schedule information by the hub;
   determining, by the system, a probability value that indicates that the deviation will result in an alert event;
   generating and sending, by the system, via direct electrical connection or via one or more networks, an alert signal to the second entity based on the probability value indicating that the deviation will result in the alert event being equal to or greater than a defined threshold, wherein the alert signal causes a notification to be generated at the hub, wherein the notification comprises a first entity location, wherein a first entity is likely to be affected by the deviation, the device is a mobile device worn by or associated with the first entity, and a second entity is distinct from but associated with the first entity, wherein the first entity is a dependent of the second entity, wherein the second entity is a caretaker of the first entity; and
   generating and sending, by the system, via direct electrical connection or via one or more networks, a second alert signal to a third entity based on a determination that the first entity is within a defined proximity of the third entity and based on the probability value indicating that the deviation will result in the alert event being equal to or greater than a defined threshold, the third entity being another caregiver of the first entity.

2. The computer-implemented method of claim 1, further comprising:
   receiving, by the system, information from a second hub of the plurality of hubs, wherein the information is generated employing blockchain technology and is indicative of a monitored status of the device; and
   updating, by the system, to a second status of the device amongst the hub and the second hub based on a change in the monitored status of the device.

3. The computer-implemented method of claim 2, wherein the monitored status is selected from a group consisting of a location of the device and an active wireless communication connection of the device.

4. The computer-implemented method of claim 1, wherein the notification is a digital image.

5. The computer-implemented method of claim 1, further comprising:
   sending, by the system, the alert signal to the hub and a second hub based on determining that the device has disconnected from the hub and has failed to connect to the second hub, wherein the alert signal causes notification to be generated at the hub and the second hub.

6. The computer-implemented method of claim 5, wherein the notification is selected from a group consisting of a text message, a noise, an audible command, and a digital image.

7. The computer-implemented method of claim 1, wherein the schedule information comprises a parameter selected from a group consisting of an event, a location, a date, and a time, and wherein the determining the schedule information comprises employing a word embedding technique to identify and extract information from a scheduling application associated with the second entity.

8. The computer-implemented of claim 1, wherein the identifying the deviation comprises tracking of a location of the hub and comparing the location to the schedule information.

9. The computer-implemented method of claim 1, wherein software is provided as a service in a cloud environment to perform the tracking the location of the hub.

10. The computer-implemented method of claim 1, wherein the alert event comprises disconnection of the device from the hub and failure of the device to connect to a second hub from the plurality of hubs.

11. The computer-implemented method of claim 1, further comprising:

extracting, by the system, a social action from an information corpus, wherein the determining the schedule information is based on the social action.

12. The computer-implemented method of claim 11, wherein the information corpus is selected from a group consisting of a text message and a website on the Internet.

13. The computer-implemented method of claim 11, wherein the information corpus comprises a social media post and the social action comprises an event the second entity plans to attend, a place the second entity plans to visit or an errand the second entity plans to perform, and wherein the social action is determined based on evaluation of content of the social media post.

14. The computer-implemented of claim 1, wherein the hub is selected from a group consisting of a smartphone, a personal computer or a tablet.

15. The computer-implemented of claim 1, wherein the device is selected from a group consisting of a smartphone, a wearable device, smart eyewear or a smart watch.

16. The computer-implemented of claim 1, wherein the alert event is equal to or greater than the defined threshold based on a determination that the device is more than a defined distance from the hub.

17. The computer-implemented method of claim 1, wherein the determining schedule information comprises:

identifying, by the device, a text message from the second entity;

determining, by the device, a name in the text message is a name of the first entity based on comparison of the name with an authorized caregivers database; and extracting, by the device, the text message and updating the schedule information with content of the text message, wherein the identifying, the determining and the extracting is performed employed word embedding techniques or natural language techniques.

* * * * *